United States Patent [19]

Worner et al.

[11] 3,745,847
[45] July 17, 1973

[54] INSTALLATION FOR ENGAGING A REVERSE-SPEED GEAR WHEEL IN MOTOR VEHICLE CHANGE-SPEED TRANSMISSIONS

[75] Inventors: Gunter Worner, Rommelshausen; Peter Schrape, Stuttgart, both of Germany

[73] Assignee: Daimler-Benz Aktiengesellschaft, Stuttgart, Germany

[22] Filed: Apr. 16, 1971

[21] Appl. No.: 134,644

[30] Foreign Application Priority Data
Apr. 17, 1970 Germany.................. P 20 18 399.7

[52] U.S. Cl. ............................................. 74/339
[51] Int. Cl. ............................................. F16h 3/38
[58] Field of Search .................................. 74/339

[56] References Cited
UNITED STATES PATENTS
2,044,930  6/1936  Zubaty................................ 74/339
3,109,317  11/1963  Cousino et al.................... 74/339 X FOREIGN PATENTS OR APPLICATIONS
1,313,752  11/1962  France............................... 74/339

Primary Examiner—Leonard H. Gerin
Attorney—Craig, Antonelli & Hill

[57] ABSTRACT

An installation for assisting the meshing engagement of a reverse speed gear wheel in a change-speed transmission intended in particular for motor vehicles, in which the reversing gear is constructed as sliding gear wheel and is adapted to be engaged with the gear wheels on the counter shaft and on the main shaft by means of a shifting element; the gear wheel on the counter-shaft is thereby wider in the direction toward the sliding gear wheel than the gear wheel on the main shaft while a brake constructed in the manner of blocking synchronizing device which cooperates with a fixed part of the transmission is coordinated to the sliding gear wheel.

16 Claims, 3 Drawing Figures

PATENTED JUL 17 1973 3,745,847

INVENTORS
GÜNTER WÖRNER
PETER SCHRAPE

BY Craig, Antonelli, Stewart & Hill
ATTORNEYS

INSTALLATION FOR ENGAGING A REVERSE-SPEED GEAR WHEEL IN MOTOR VEHICLE CHANGE-SPEED TRANSMISSIONS

The present invention relates to an installation for meshingly engaging a reverse speed gear wheel in a change-speed transmission intended in particular for motor vehicles, whereby the reversing gear-wheel of the reverse speed is constructed as sliding gear-wheel and is adapted to be meshed with the gear-wheels on the counter-shaft and on the main shaft by means of a shifting element.

During the engagement of the reverse speed, frequently disturbing noises arise and, more particularly, even if the vehicle stands still because the counter-shaft with all gear-wheels and with the clutch disk rotates in the forward direction. As solution to the problem, so-called reverse speed brakes are already known in the prior art or have been proposed heretofore which, however, cannot achieve any rear remedial action because they do not block the movement of the sliding gear wheel.

The present invention is concerned with the task to provide a solution to this problem. The underlying problems are solved with installations of the aforementioned type according to the present invention in that the gear wheel on the counter-shaft is wider in the direction toward the sliding gear wheel than the gear wheel on the main shaft, and in that a braking device cooperating with a fixed part of the transmission and constructed in the manner of a blocking synchronization means is coordinated to the sliding gear wheel.

It is attained by the construction according to the present invention that the sliding gear wheel of the reverse speed is able to mesh and engage in every case noiselessly with the gear wheel on the main shaft. More particularly, the blocking means provided according to the present invention prevents a meshing also when the sliding path predetermined by the wide difference should not yet have sufficed for the complete braking of the sliding gear wheel inclusive the counter-shaft now rotating in unison therewith.

The present invention prefers a solution according to which the sliding gear-wheel carries or forms a synchronizing cone on the side facing the other gear wheels and according to which a counter-cone is supported in a rotatably limited and axially displaceable manner on the sliding gear shaft and in that this counter-cone is adapted to be engaged elastically or springily at the synchronizing cone of the sliding gear wheel.

In one embodiment according to the present invention, the counter-cone is secured on a disk in the form of spectacles, i.e., on an eye-glass-like disk, or is constituted thereby and two bolts extending axially parallel are secured in this disk and are directed toward a housing wall, whereby these bolts engage with the ends thereof in corresponding housing apertures, taking into consideration the predetermined circumferential movability. It is thereby possible without any difficulties to construct this spectacle-like disk together with the counter-cone as unitary sheet-metal stamping or pressed out part.

In detail, it is proposed in connection therewith that the housing apertures or recesses are provided at least at the parts thereof disposed in the circumferential direction with inclined blocking surfaces that cooperate with correspondingly inclined counter-surfaces at the bolts.

A further feature of the present invention resides in that each bolt—starting from the spectacle-like disk—is provided with a cylindrical section intended for the engagement, adjoined by a cone section acting as counter-surface and again provided at the end with a cylindrical section effective as guide means.

In another embodiment according to the present invention, the counter-cone is supported with a hub portion on the sliding gear shaft and the hub portion is provided with a longitudinal slot open towards its end, into which engage stationary cross pins. These pins may be formed, for example, simply by bolts extending transversely through the shaft. On the other hand, it is also feasible to utilize at this place corresponding housing profiles, i.e., therefore inclined surfaces in a housing bore. The latter or the pins act as blocking surfaces in order to prevent a displacement of the hub portion and therewith of the counter-cone. It is proposed for that purpose according to the present invention that the slots are provided at their mouth with a guide section enlarged correspondingly to the predetermined circumferential play, adjoined by the inclined counter-surfaces and thereafter by a narrower section for the engagement.

According to a further feature and development of the inventive concept, the axial displacement path of the sliding gear wheel is so limited that the guide parts at the counter-cone do not become disengaged from the apertures in the stationary part, for example, in the housing. In this manner, the blocking synchronization is kept constantly in readiness without requiring any special meshing or engagement for that purpose.

The spring which keeps the counter-cone in constant abutment at the synchronizing cone of the sliding gear wheel is supported either on the sliding gear shaft or on the hub of the counter-cone itself.

Accordingly, it is an object of the present invention to provide an installation for engaging a reverse speed gear-wheel in motor vehicle change-speed transmissions which avoids the aforementioned shortcomings and drawbacks encountered in the prior art.

Another object of the present invention resides in a motor vehicle change-speed transmission which effectively eliminates disturbing noises during the engagement of the reverse speed.

A further object of the present invention resides in a motor vehicle change-speed transmission of the type described above which is simple in construction, requires relatively few parts that can be readily manufactured and assembled and assures a noise-free engagement of the reverse speed.

These and further objects, features and advantages of the present invention will become more obvious from the following description when taken in connection with the accompanying drawing which shows, for purposes of illustration only, two embodiments in accordance with the present invention, and wherein.

Figure 1:
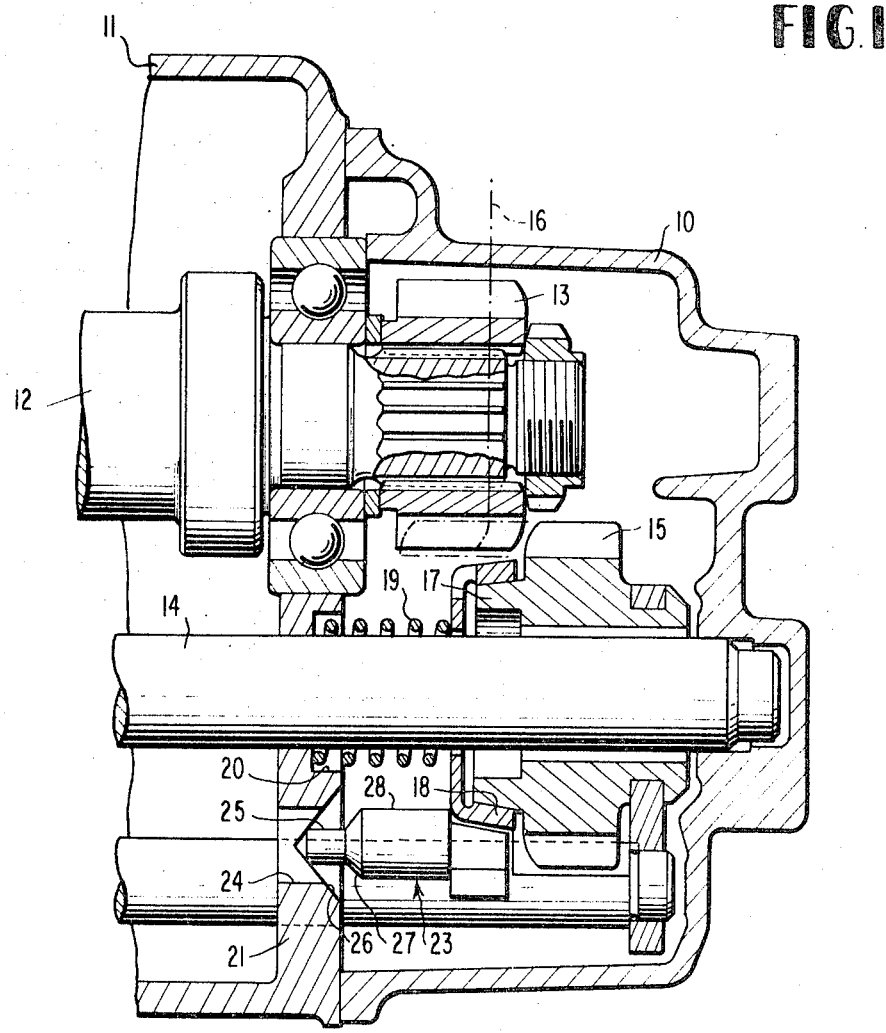
FIG. 1 is a longitudinal cross-sectional view through a reverse-speed arrangement of a motor vehicle transmission in accordance with the present invention.
Figure 2:
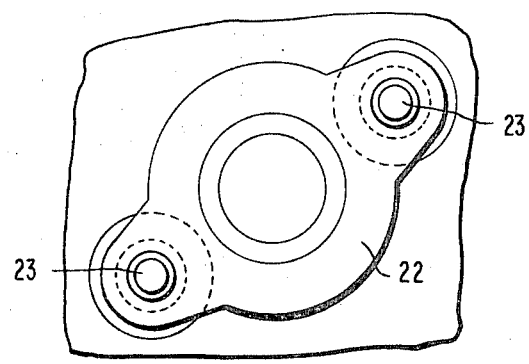
FIG. 2 is a partial view of the spectacle-like disk part at the counter-cone of FIG. 1.

Referring now to the drawing wherein like reference numerals are used throughout the various views to designate like parts and, more particularly, to FIGS. 1 and 2, the gear wheels of the reverse speed are accommodated in these figures within a cover 10 of the transmission housing 11. A gear wheel 13 is arranged on the counter-shaft 12. A shaft 14 securely mounted in the cover 10 and housing 11 carries a sliding gear wheel 15. A gear wheel, not illustrated in detail, is arranged on the main shaft, also not shown in the drawing of conventional construction; the outer boundary of the gear wheel mounted on the main shaft (not shown) is indicated in FIG. 1 by the dash and dot line 16. The gear wheel 13 on the counter shaft 12 is therefore wider in the direction toward the sliding gear wheel 15 than the gear wheel on the main shaft.

A synchronizing cone 17 is arranged at the sliding gear wheel 15 which cooperates with a counter-cone 18. This counter-cone 18 is held in constant abutment at the synchronizing cone 17 by a spring 19. The spring 19 is supported at the bottom of a recess 20 of the housing wall 21.

The counter-cone 18 is arranged according to FIG. 2 on a spectacle-like disk member 22, i.e., in the form of a frame for eyeglasses, which receives two laterally arranged axially parallel bolts 23.

These bolts 23 engage in apertures 24 of the housing wall 21 or of any other stationary part of the transmission. The bolts 23 include at the end thereof cylindrical guide portions 25 which permit with respect to the apertures 24 a limited play in the circumferential direction. The bore 24 is provided at the side facing the sliding gear wheel 15 with conical blocking surfaces 26 that cooperate with correspondingly inclined counter-surfaces 27 at the bolts 23. A cylindrical section 28 again adjoins these inclined counter-surfaces 27, which corresponds approximately to the dimensions of the bore 24.

For purposes of engagement, the sliding gear wheel 15 is displaced from the illustrated position toward the left, as viewed in FIG. 1. It initially meshes with the gear wheel 13 on the counter-shaft 12 and is taken along by the latter in the forward direction of rotation. A friction moment occurs thereby at the synchronizing cone 17 since the counter-cone 18 does not rotate along. The counter-cone 18 has been displaced exclusively by the predetermined circumferential play between the guide pins 25 and the bore 24 whereby the counter-surfaces 27 abut at the blocking surfaces 26. A further axial movement of the sliding gear wheel 15 is now prevented for such length of time until the sliding gear wheel 15 inclusive the counter-shaft 12 reaches standstill. Only at that point the sliding gear wheel 15 can be brought into meshing engagement with the gear wheel on the main shaft whereby the spectacle-like disk element 22 with the counter-cone 18 thereof is moved back in the circumferential direction by the predetermined play and the bolts 23 engage with the cylindrical portions 28 thereof in the bores 24.

Figure 3:
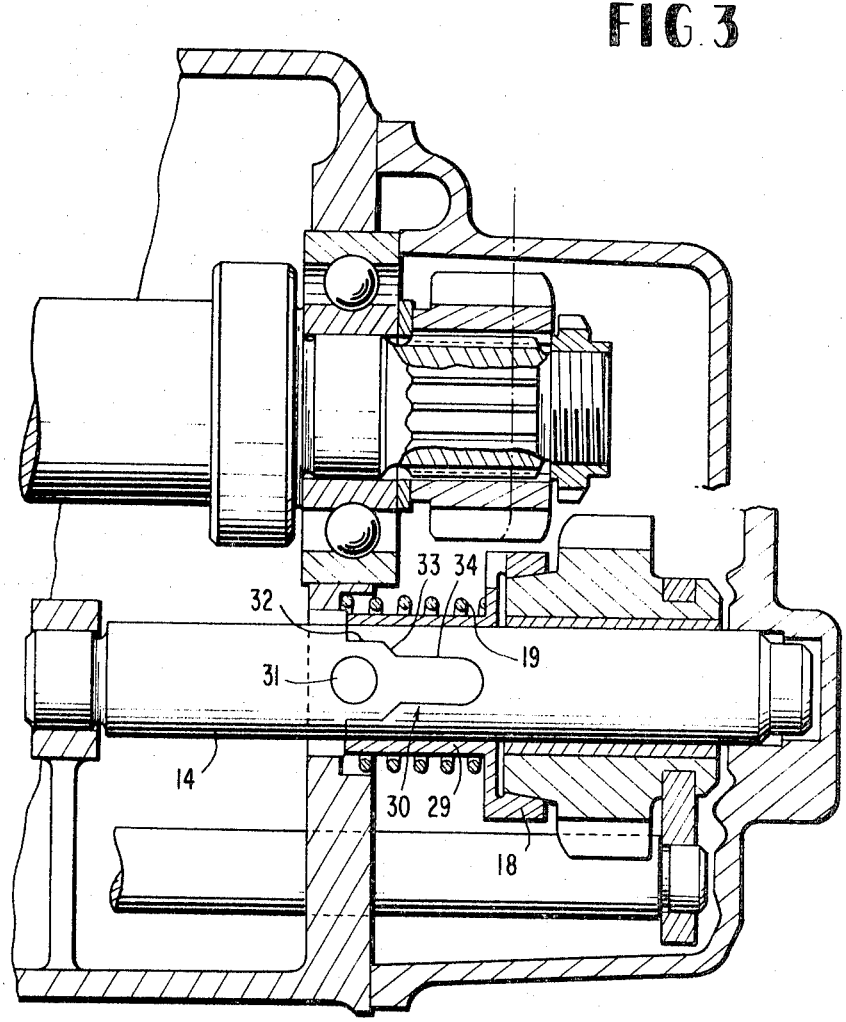
FIG. 3 is a partial longitudinal cross-sectional view through a modified embodiment of a reverse-speed arrangement of a change-speed transmission in accordance with the present invention.

According to FIG. 3, the counter-cone 18 includes a hub portion 29 that is provided with longitudinal slots generally designated by reference numeral 30. A bolt 31 is placed transversely through the sliding gear wheel shaft 14 which forms the blocking surfaces, so to speak of.

The slots 30 have an enlarged guide portion 32 at the mouth thereof, which are adjoined by the counter surfaces 33. The counter-surfaces 33 again pass over into the engaging portion 34. The spring 19 is arranged on the hub portion 29. The operation of the embodiment of FIG. 3 corresponds exactly to that of FIGS. 1 and 2.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An installation for meshingly engaging a reverse-speed gear wheel of a change-speed transmission, which includes a reversing gear wheel for the reverse speed constructed as sliding gear wheel adapted to be meshingly engaged with gear wheels on a counter shaft and on a main shaft by means of a shifting element, characterized in that the gear wheel on the counter shaft is wider in the direction toward the sliding gear wheel than the gear wheel on the main shaft, and in that a brake means constructed in the manner of a blocking synchronization means and cooperating with a fixed part of the transmission is operatively coordinated to said sliding gear wheel for effecting synchronization of the shifting into the reverse speed.

2. An installation according to claim 1, characterized in that the sliding gear wheel includes a synchronizing cone means on the side facing the other gear wheels, and in that a counter-cone means is supported in a rotatably limited and axially displaceable manner on the sliding gear wheel shaft, and in that this counter-cone means is adapted to be yieldingly engaged against the synchronizing cone means.

3. An installation according to claim 2, characterized in that the sliding gear wheel carries a synchronizing cone means.

4. An installation according to claim 2, characterized in that the sliding gear wheel forms said synchronizing cone means.

5. An installation according to claim 2, characterized in that the axial displacement path of the sliding gear wheel is so limited that guide means at the counter-cone means do not come out of engage-ment with complementary means.

6. An installation for meshingly engaging a reverse-speed gear wheel of a change-speed transmission, which includes a reversing gear wheel for the reverse speed constructed as sliding gear wheel adapted to be meshingly engaged with gear wheels on a counter shaft and on a main shaft by means of a shifting element, characterized in that the gear wheel on the counter shaft is wider in the direction toward the sliding gear wheel than the gear wheel on the main shaft, in that a brake means constructed in the manner of a blocking synchronization means and cooperating with a fixed part of the transmission is operatively coordinated to said sliding gear wheel, in that the sliding gear wheel includes a synchronizing cone means on the side facing the other gear wheels, in that a counter-cone means is supported in a rotatably limited and axially displaceable manner on the sliding gear wheel shaft, and in that this counter-cone means is adapted to be yieldingly engaged against the synchronizing cone means, in that the counter-cone means is fixed on a spectacle-like disk means and in that two substantially axially parallel bolts are secured in said disk means and are directed toward a housing wall, said bolt means engaging with the ends thereof in corresponding housing aperture means with due consideration to the predetermined circumferential movability determined by the limited rotatability.

7. An installation according to claim 6, characterized in that said disk means is secured on said counter-cone means.

8. An installation according to claim 6, characterized in that said disk means is formed by said counter-cone means itself.

9. An installation according to claim 6, characterized in that said housing aperture means are provided at least at the portions thereof disposed in the circumferential direction with inclined blocking surface means that cooperate with correspondingly inclined counter-surface means at the bolts.

10. An installation according to claim 9, characterized in that each bolt, starting from the disk means, includes a cylindrical portion intended for the engagement, adjoined by a conical portion effective as counter-surface means, and in turn adjoined at the end thereof by a cylindrical portion effective as guide means.

11. An installation according to claim 10, characterized in that the axial displacement path of the sliding gear wheel is so limited that guide means at the counter-cone means do not come out of engagement with complementary means.

12. An installation according to claim 11, characterized in that the guide means are provided at the bolts and the complementary means are formed by the aperture means.

13. An installation for meshingly engaging a reverse speed gear wheel of a change-speed transmission, which includes a reversing gear wheel for the reverse speed constructed as sliding gear wheel adapted to be meshingly engaged with gear wheels on a counter shaft and on a main shaft by means of a shifting element, characterized in that the gear wheel on the counter shaft is wider in the direction toward the sliding gear wheel than the gear wheel on the main shaft, in that a brake means constructed in the manner of a blocking synchronization means and cooperating with a fixed part of the transmission is operatively coordinated to said sliding gear wheel, in that the sliding gear wheel includes a synchronizing cone means on the side facing the other gear wheels, in that a counter-cone means is supported in a rotatably limited and axially displaceable manner on the sliding gear wheel shaft, and in that this counter-cone means is adapted to be yielding engaged against the synchronizing cone means, in that the counter-cone means is supported with a hub portion on the sliding gear wheel shaft, and in that the hub portion is provided with longitudinal slots open towards its end, into which engage stationary cross pins.

14. An installation according to claim 13, characterized in that each slot is provided at its mouth with a guide portion enlarged corresponding to the predetermined circumferential play which is adjoined by the inclined counter-surface means and in turn is followed by a narrower portion for the engagement.

15. An installation according to claim 14, characterized in that the axial displacement path of the sliding gear wheel is so limited that guide means at the counter-cone means do not come out of engagement with complementary means.

16. An installation according to claim 15, characterized in that guide means are formed in the longitudinal slots and the complementary means are formed by the cross pins.

* * * * *